2,987,518
Patented June 6, 1961

2,987,518
CERTAIN 1H[4,5-c]-IMIDAZOPYRIDINES
Karl Hoffmann, Binningen, and Alfred Hunger, Jindrich Kebrle and Alberto Rossi, Basel, Switzerland, assignors to Ciba Pharmaceutical Products Inc., Summit, N.J.
No Drawing. Filed Nov. 25, 1959, Ser. No. 855,273
Claims priority, application Switzerland Dec. 10, 1958
7 Claims. (Cl. 260—294.8)

This invention provides 1-(β-diethylaminoethyl)-2-aryl-methyl aza-benzimidazoles, the aryl radical of which contains at most 2 benzene rings, especially 5-aza- and -7-aza-benzimidazoles, and acid addition salts thereof. The aryl radical and the pyridine ring of the azabenzimidazole may be unsubstituted or substituted by hydroxyl, lower alkyl, lower alkoxy, lower alkyl mercapto especially methyl, ethyl, propyl, methoxy, ethoxy, propoxy, methyl or ethyl mercapto, the amino or nitro group or halogen. The invention provides more especially azabenzimidazoles of the formulas

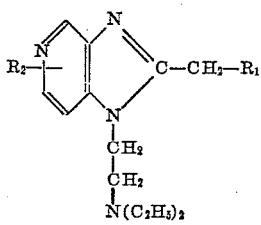

and

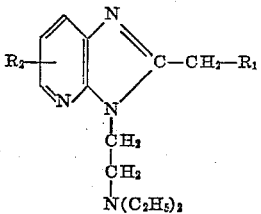

in which $R_1$ represents an unsubstituted phenyl group or a phenyl group substituted in the 3- and/or 4-position by halogen, lower alkyl, lower alkylmercapto or lower alkoxy, and $R_2$ represents hydrogen or halogen or a lower alkyl, lower alkoxy, amino or nitro group, and acid addition salts of these compounds.

The new compounds possess a very good analgesic action and therefore are useful as medicaments. Of special interest on account of their therapeutic properties are the 5-aza-compounds of the formula

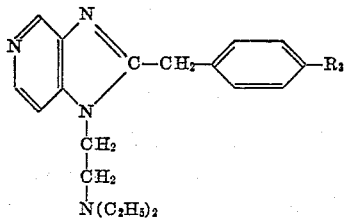

in which $R_3$ represents a hydrogen or chlorine atom or a lower alkyl or lower alkoxy group and more especially 1 - (β - diethyl - aminoethyl) - 2 - (para - ethoxybenzyl)-5-aza-benzimidazole and corresponding 5-nitro-7-aza-benzimidazoles and acid addition salts thereof.

The new benzimidazoles can be made by methods in themselves known. In one process, for example, the azabenzimidazole ring is formed by subjecting to ring closure an aminopyridine which contains in ortho-position to the amino group a β-diethylaminoethylamino group or a substituent convertible into such group, for example, a hydroxyethylamino group, or a corresponding N-substituted derivative thereof. The substituent convertible into the aminoalkylamino group is then subsequently converted into such group, in the case of a hydroxyethylamino group, for example, by chlorination followed by reaction with diethylamine. Thus, for example, a 3-amino-4-(β-diethylamino ethylamino)-pyridine may be subjected to ring closure directly or in stages with an aryl-acetic acid the aryl group of which has at most 2 benzene rings or a functional derivative thereof, especially an ester thereof with an alcohol or imino-ether that can easily be split off. The final products can also be made by using for the condensation, instead of an aryl acetic acid, an aryl-acetaldehyde or a functional derivative thereof, and oxidizing the resulting product. In the aforesaid reactions the starting materials may be formed under the conditions of reaction. Thus, for example, it is of advantage to subject an aryl acetylamino-pyridine, which contains a halogen atom in ortho-position to the amino group, to ring closure with β-diethylaminoethylamine to form the corresponding azabenzimidazole derivative.

There may also be introduced into the aryl or pyridine nucleus of the products, for example, a nitro group by nitration, or groups already present may be exchanged for other groups, for example, a hydroxyl group may be converted into an etherified or esterified hydroxyl group, such as a lower alkoxy group, or a nitro group may be converted into an amino group and the latter group into a lower alkoxy group or a halogen atom.

The reactions are carried out in the presence or absence of a diluent and/or condensing agent, when necessary, at a raised temperature under atmospheric or superatmospheric pressure.

Depending on the procedure used, the new compounds are obtained in the form of the free bases or salts thereof. From the salts the free bases can be obtained by methods in themselves known. From the free bases salts can be made by reaction with acids suitable for making therapeutically useful salts, for example, hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, oxyethane sulfonic acid, benzene or toluene sulfonic acid, or a therapeutically active acid.

The starting materials are known or can be made by methods in themselves known.

The new compounds may be used as medicaments, for example, in the form of pharmaceutical preparations which contain the compound or a salt thereof in admixture with a pharmaceutical organic or inorganic, solid or liquid carrier suitable for enteral, parenteral or topical administration. For making the carriers there are used substances which do not react with the new compounds, for example, water gelatine, lactose, starches, magnesium stearate, talc, vegetable oils, benzyl alcohols, gums, polyalkylene glycols, white petroleum jelly, cholesterol or other known carrier for medicaments. The pharmaceutical preparations may be, for example, in the form of tablets, dragees, salves, or creams, or in liquid form, as solutions, suspensions, or emulsions. If desired they may be sterilized and/or may contain auxiliary substances, such as preserving, stabilizing, wetting or emulsifying agents, salts for regulating the osmotic pressure or buffers. They may also contain other therapeutically valuable substances.

The following examples illustrate the invention:

Example 1

A solution of 4.2 grams of 2-(β-diethylamino-ethylamino) 3-aminopyridine in 20 ml. of chloroform is added to the imino-ether hydrochloride of para-ethoxyphenylacetic acid, obtained from 12.8 grams of para-ethoxybenzyl cyanide and 4.6 ml. of ethanol in 80 ml. of chloroform by introducing dry hydrogen chloride gas at —10° C. and allowing the whole to stand at 25° C. for 16 hours. The reaction mixture is boiled for 24 hours under reflux, then evaporated in vacuo, and taken up in a mixture of 100 ml. of 2 N-hydrochloric acid and 100 ml. of ethyl acetate. The aqueous layer is treated with animal charcoal, filtered, and rendered alkaline with ammonia. The precipitation bases are taken up in ether, dried with magnesium sulfate and evaporated in vacuo. 1-(β-diethylaminoethyl) - 2 - (para-ethoxybenzyl) - 7-aza-benzimidazole of the formula

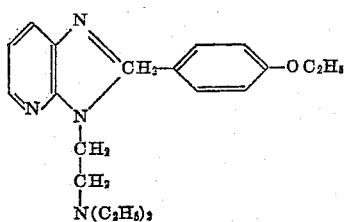

remains behind as a crystallisate melting at 72° C. Its hydrochloride melts at 175° C.

The 2-(β-diethylamino-ethylamino) - 3-amino-pyridine used as starting material can be prepared as follows:

A warm solution of 23 grams of 2-chloro-3-nitro-pyridine in 150 ml. of toluene is added dropwise at 80° C. to a solution of 26 ml. of diethylamino-ethylamine in 50 ml. of toluene, while stirring, and then the whole is boiled under reflux for 2 hours. 50 ml. of a 2 N-solution of caustic soda are stirred into the cooled reaction mixture, the toluene layer is separated in a separating funnel, the base is extracted with 2 N-hydrochloric acid, and the base is liberated from the aqueous layer by means of ammonia. The bases are taken up in ether, the ethereal solution is dried in magnesium sulfate, the solvent is expelled and the residue is distilled in a high vacuum. 2-(β-diethylamino-ethylamino)-3-nitropyridine of the formula

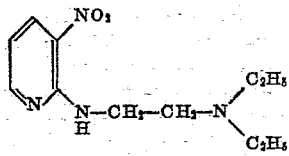

distils as an orange-yellow easily mobile oil at 120° C. under 0.05 Tor. in a bulb tube.

26 grams of 2-(β-diethylamino-ethylamino)-3-nitro-pyridine are hydrogenated in 200 ml. of ethanol with 5 grams of Raney nickel as catalyst in an agitated duck-shaped vessel under normal pressure and room temperature. The hydrogenation takes place rapidly. The product is autoxidisable.

The 2-(β-diethylamino-ethylamino)-3-aminopyridine of the formula

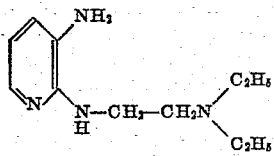

distils, after removing the solvent, in a bulb tube under a high vacuum at 140° C. under 0.05 Tor.

Example 2

1 - (β-diethylamino-ethyl) - 2 - (para-chlorobenzyl)-7-aza-benzimidazole of the formula

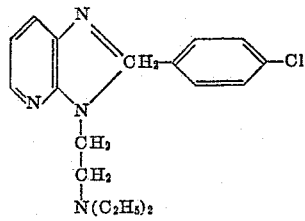

is prepared in a manner exactly analogous to that described in Example 1 from the imino-ether hydrochloride of para-chlorophenyl acetic acid and 2-(β-diethylaminoethylamino)-3-aminopyridine. The hydrochloride of the resulting compound melts at 180° C.

Example 3

1 - (β-diethylamino-ethyl) - 2 - (para-methoxybenzly)-7-aza-benzimidazole of the formula

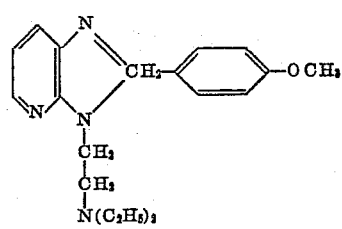

is prepared in a manner analogous to that described in Example 1 from t he imino-ether hydrochloride of para-methoxyphenyl-acetic acid and 2-(β-diethylamino-ethylamino)-3-aminopyridine. The free base distils at 200° under 0.02 Tor. in a bulb tube. The hydrobromide of the resulting compound melts at 143° C.

Example 4

1 - (β - diethylamino-ethyl) - 2(2':5'-dimethoxybenzyl) 7-aza-benzimidazole of the formula

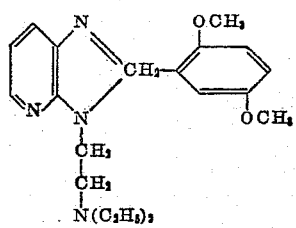

is prepared in a manner analogous to that described in Example 1 from the imino-ether hydrochloride of 2:5-dimethoxyphenylacetic acid and 2-(β-diethylamino-ethylamino)-3-aminopyridine. The hydrochloride of the resulting compound melts at 150° C.

Example 5

A solution of 4.4 grams of 2-(β-diethylamino-ethylamino)-3-amino-5-nitropyridine hydrochloride in 100 ml. of glacial acetic acid is added to the imino-ether hydrochloride of para-ethoxyphenylacetic acid, obtained from 7.25 grams of para-ethoxyphenyl-acetonitrile and 2.6 ml. of ethanol, dissolved in 60 ml. of chloroform, by saturation with hydrogen chloride at 0° C., allowing the mixture to stand at room temperature overnight, and removing the chloroform in vacuo. The reaction solution is heated for 18 hours at 45° C., then evaporated in vacuo, the residue is taken up in water, and the aqueous solution is rendered alkaline with ammonia and extracted with ether. The ethereal extract is agitated with dilute hydrochloric acid, the base is again liberated with ammonia and taken up in ether. By concentrating the ethereal solution 1-(β-diethylamino-ethyl)-2-(para-ethoxy-benzyl)-5-nitro-7-aza-benzimidazole of the formula

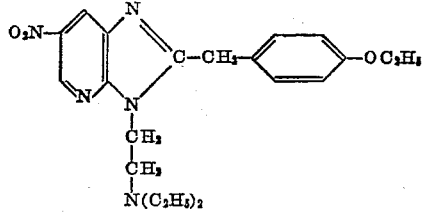

crystallizes out in needles melting at 79-80° C. The hydrochloride of the base melting at 186° C.

The 2-(β-diethylamino-ethylamino)-3-amino-5-nitropyridine hydrochloride used as starting material can be prepared as follows:

20.3 grams of 2-chloro-3:5-dinitropyridine and 17 grams of diethylamino-ethylamine are reacted in 200 ml. of toluene in the manner described in Example 1 to form 2-(β-diethylamino-ethylamino)-3:5-dinitropyridine of the formula

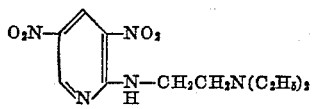

The base is yellow and crystalline and melts at 66° C. Its hydrochloride is also yellow and melts at 179-180° C.

5.5 grams of 2-(β-diethylamino-ethylamino)-3:5-dinitropyridine are dissolved in 50 ml. of alcohol at 70° C., 11 ml. of concentrated ammonia solution are added, and the solution is saturated with hydrogen sulfide gas at that temperature. The solution is then evaporated in vacuo, the residue is taken up in 10 ml. of 5 N-hydrochloric acid, treated with animal charcoal, filtered, and the filtrate is rendered alkaline with ammonia. The base is taken up in ether the ethereal solution is dried with magnetisum sulfate, the solvent is removed, and the base is purified by way of its hydrochloride. The base is liberated by treating an aqueous solution of the hydrochloride with ammonia, and is then crystallized from benzene.

2-(β-diethylamino-ethylamino)-3-amino-5-nitropyridine of the formula

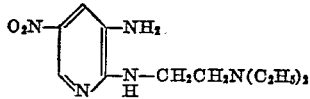

is brown-red and melts at 83° C. Its hydrochloride melts at 200-205° C.

Example 6

1-(β-diethylaminoethyl) - 2 - (para-methoxybenzyl)-5-nitro-7-aza-benzimidazole of the formula

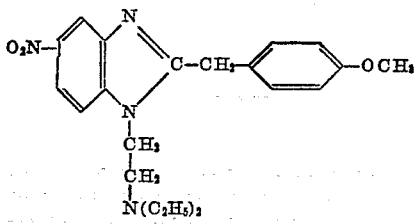

is prepared in a manner analogous to that described in Example 5 by reacting the imino-ether hydrochloride of para-methoxyphenylacetic acid with 2-(β-diethylaminoethylamino)-3-amino-5-nitropyridine. The hydrochloride of the resulting compound melts at 156° C.

Example 7

1-(β-diethylamino-ethyl)-2-(para-chlorobenzyl)-5-nitro-7-aza-benzimidazole of the formula

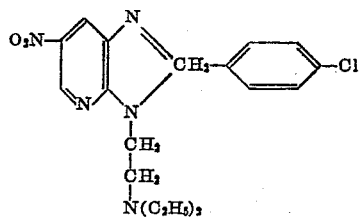

is prepared in am anner analogous to that described in Example 5 by reacting the imino-ether hydrochloride of para-chlorophenyl acetic acid with 2-(β-diethylaminoethylamino) - 3-amino-5-nitro-pyridine. The free base melts at 111-112° C., and its hydrochloride at 196-197° C.

Example 8

4.1 grams of 3-amino-4-(β-diethylamino-ethylamino)-pyridine in 80 ml. of glacial acetic acid are added to the imino-ether hydrochloride of para-chlorophenylacetic acid, obtained from 12.1 grams of para-chlorobenzyl cyanide and 4.65 ml. of absolute alcohol in 80 ml. of chloroform by introducing dry hydrogen chloride gas at —10° C., allowing the whole to stand for 16 hours at room temperature, and evaporating the mixture under reduced pressure.

After stirring the solution for 16 hours at 38° C., the reaction mixture is evaporated in vacuo, the residue is taken up in aqueous hydrchloric acid, the acid solution is washed with ethyl acetate, then rendered alkaline with ammonia solution, extracted with ethyl acetate, and the ethyl acetate solution is dried with magnesium sulfate and evaporated.

The residue is crystallized from a mixture of acetone and petroleum ether, whereby 1-(β-diethylaminoethyl)-2-(para-chlorobenzyl)-5-aza-benzimidazole of the formula

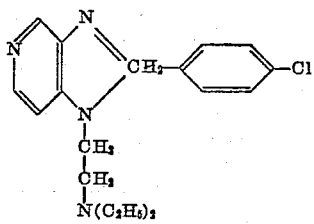

is obtained as colorless crystals melting at 116-117° C.

The 3-amino-4-(β-diethylamino-ethylamino)-pyridine used as starting material is prepared as follows:

To a solution of 13.5 grams of diethylamino-ethylamine is 70 ml. of absolute toluene is added dropwise at room temperature while stirring, a solution of 12.3 grams of 3-nitro-4-chloro-pyridine in 20 ml. of absolute toluene. After stirring the mixture for 2 hours at 80° C., the cooled reaction mixture is extracted with dilute hydrochloric acid, the acid solution is rendered alkaline with aqueous ammonia solution, and extracted with chloroform.

The residue, which remains after evaporating the chloroform, is distilled in a high vacuum, whereby 3-nitro-4-(β-diethylamino-ethylamino)-pyridine is obtained as a red oil boiling at 141-143° C. under 0.05 Tor.

12.5 grams of the latter nitro-compound are dissolved in 70 ml. of alcohol, and hydrogenated in the presence of a nickel or palladium catalyst until the theoretical quantity of hydrogen has been absorbed. The catalyst is filtered off, the solution is evaporated under reduced pressure, and the residue is distilled in a high vacuum, whereby 3-amino-4-(β-diethylamino-ethylamino)-pyridine is obtained as a thick oil boiling at 155–160° C. under 0.07 mm. pressure. Its dihydrochloride melts at 244–247° with decomposition.

Example 9

To a solution of 7.7 grams of 3-amino-4-(β-diethyl-aminoethylamino)-pyridine in 70 ml. of absolute dioxane is added at room temperature, while stirring, dropwise, a solution of 5.8 grams of phenylacetyl chloride, and the whole is stirred for 3 hours at 50–60° C., whereby a sticky mass is formed. It is then evaporated under reduced pressure, and the residue is taken up in 2 N-hydrochloric acid and extracted with ethyl acetate. The acid aqueous layer is rendered neutral with ammonium solution and extracted with ethyl acetate.

The residue is crystallized from a mixture of acetone, ether and petroleum ether, whereby 4-(β-diethylamino-ethylamino)-3-(α-phenyl-acetylamido)-pyridine is obtained in the form of colorless crystals melting at 135–137° C.

1.5 grams of the latter substance are heated for 2 hours in an atmosphere of nitrogen at 160–190° C., whereby 1-(β-diethylamino-ethyl)-2-benzyl-5-aza-benzimadazole of the formula

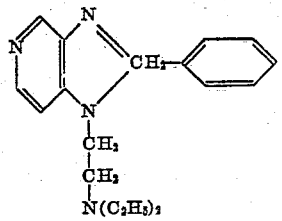

is obtained as a colorless oil.

By reacting the base in alcoholic solution with the calculated quantity of hydrochloric acid in ethyl acetate the hydrochloride melting at 237–240° C. is obtained.

Example 10

10 grams of 3-amino-4-(β-diethylamino-ethylamino)-pyridine in 200 ml. of glacial acetic acid are added to the imino-ether hydrochloride of para-methoxyphenyl-acetic acid, obtained from 29.6 grams of para-methoxybenzyl cyanide and 11.4 ml. of absolute alcohol in 200 ml. of chloroform by introducing dry hydrogen chloride gas at —10° C., allowing the mixture to stand for 16 hours at 24° C., and evaporating the mixture under reduced pressure.

The whole is then stirred at 38° C. for 16 hours. The reaction mixture is evaporated under reduced pressure, the residue is taken up in aqueous hydrochloric acid, the acid solution is washed with ethyl acetate, and the washed solution is rendered alkaline with ammonia solution, extracted with ethyl acetate, and the ethyl acetate solution is dried with magnesium sulfate and evaporated.

By distillation in a bulb tube there is obtained 1-(β-diethylamino-ethyl)-2-(para-methoxybenzyl)-5-azabenzimidazole of the formula

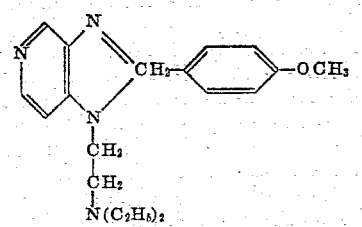

in the form of a thick oil boiling at 208–210° C. under 0.05 Tor.

Example 11

10 grams of 3-animo-4-(β-diethylamino-ethylamino)-pyridine in 200 ml. of glacial acetic acid are added to the imino-ether hydrochloride of para-ethoxyphenylacetic acid, obtained from 32 grams of para-ethoxybenzyl cyanide and 11.4 ml. of absolute alcohol in 200 ml. of chloroform by introducing dry hydrogen chloride gas at —10° C., allowing the mixture to stand for 16 hours at 25° C., and evaporating under reduced pressure. The whole is then stirred for 16 hours at 38° C., the reaction mixture is evaporated under reduced pressure, the residue is taken up in aqueous hydrochloric acid, the acid solution is washed with ethyl acetate and rendered alkaline with ammonia solution, then extracted with ethyl acetate, the ethyl acetate solution is dried with magnesium sulfate, and the dried solution is evaporated.

The oil so obtained is distilled in a bulb tube under a high vacuum, whereby a fraction boiling at 215–235° C. under 0.07 Tor. is obtained.

By crystallization from a mixture of ethyl acetate and petroleum ether there is obtained 1-(β-diethylamino-ethyl)-2-(para-ethoxybenzyl)-5-aza-benzimidazole of the formula

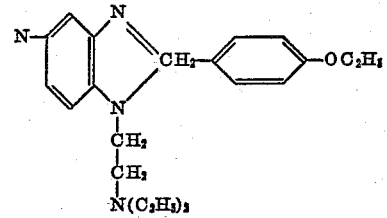

as colorless crystals melting at 77–79° C.

What is claimed is:

1. A member selected from the group consisting of azabenzimidazoles of the formulae

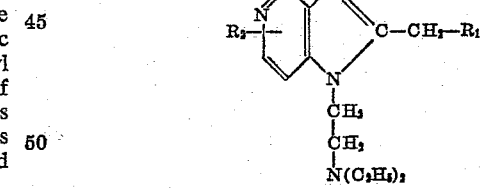

and

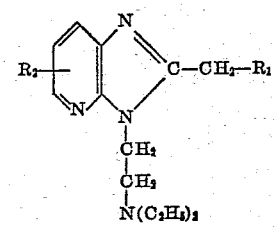

in which $R_1$ stands for a member selected from the group consisting of unsubstituted phenyl, 3-substituted phenyl, 4-substituted phenyl and 3,4-disubstituted phenyl, the substituents being selected from the group consisting of halogen, lower alkyl, lower alkylmercapto and lower alkoxy, and $R_2$ for a member selected from the group consisting of hydrogen, halogen, lower alkyl, lower alkoxy and the amino and nitro group, and therapeutically acceptable acid addition salts.

2. A compound of the formula

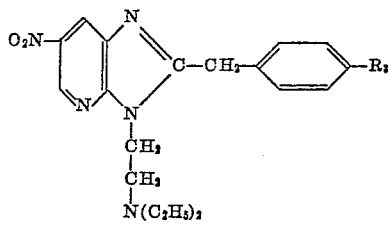

in which $R_3$ stands for lower alkoxy.

3. 1 - ($\beta$-diethylamino-ethyl)-2-(para-ethoxy-benzyl-5-azabenzimidazole.

4. 1 - ($\beta$-diethylamino-ethyl)-2-(para-ethoxybenzyl)-5-nitro-7-azabenzimidazole.

5. Therapeutically useful acid addition salts of 1-($\beta$-diethylaminoethyl) - 2 - (para-ethoxybenzyl)-5-azabenzimidazole.

6. Therapeutically useful acid addition salts of 1-($\beta$-diethylamino)-2-(para - ethoxybenzyl)-5-nitro-7-azabenzimidazole.

7. A compound of the formula:

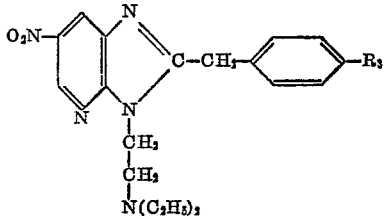

No references cited.

UNITED STATES PATENT OFFICE
CERTIFICATION OF CORRECTION

Patent No. 2,987,518    June 6, 1961

Karl Hoffmann et al.

It is hereby certified that error appears in the above numbered patent requiring correction and that the said Letters Patent should read as corrected below.

Column 1, line 16, for "mercapto espe-" read -- mercapto, espe- --; line 18, for "methyl or ethyl mercapto" read -- methyl- or ethyl-mercapto --; column 3, line 5, for "amino)3" read -- amino)-3 --; lines 21 to 26, column 4, lines 5 to 10, 25 to 30, and 47 to 51, column 6, lines 6 to 11, and 44 to 49, column 7, lines 27 to 33, and lines 63 to 69, for that portion of each of the structural formulas reading column 3, lines 44 and 45, for "etherereal" read -- ethereal --; column 4, line 23, for "methoxybenzly" read -- methoxybenzyl --; line 44, for "2(2':5'-dimethoxybenzyl)" read -- 2-(2':5'-dimethoxybenzyl)- --; column 5, line 42, for "magnetisum" read -- magnesium --; column 6, line 35, for "hydrchloric" read -- hydrochloric --; column 8, line 1, for "-animo-" read -- -amino- --; lines 26 to 31, for that portion of the structural formula reading

Signed and sealed this 1st day of May 1962.

(SEAL)
Attest:

ERNEST W. SWIDER
Attesting Officer

DAVID L. LADD
Commissioner of Patents